United States Patent
Huang et al.

(10) Patent No.: US 8,624,918 B2
(45) Date of Patent: Jan. 7, 2014

(54) ELECTRONIC READER AND CONTROL METHOD THEREOF

(75) Inventors: Hui-Ling Huang, Shenzhen (CN); Xiao-Guang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 127 days.

(21) Appl. No.: 13/172,829

(22) Filed: Jun. 30, 2011

(65) Prior Publication Data

US 2012/0169764 A1 Jul. 5, 2012

(30) Foreign Application Priority Data

Dec. 29, 2010 (CN) .......................... 2010 1 0611403

(51) Int. Cl.
*G09G 5/00* (2006.01)

(52) U.S. Cl.
USPC ........................... 345/619; 345/589; 345/581

(58) Field of Classification Search
USPC .......................... 345/619, 581, 589; 715/864
See application file for complete search history.

(56) References Cited

U.S. PATENT DOCUMENTS

| 2012/0218282 | A1* | 8/2012 | Choboter et al. | 345/589 |
| 2012/0265126 | A1* | 10/2012 | Estes | 604/66 |
| 2012/0311590 | A1* | 12/2012 | Park | 718/102 |
| 2012/0315963 | A1* | 12/2012 | Pratt et al. | 455/574 |
| 2012/0316695 | A1* | 12/2012 | Chen et al. | 700/296 |

FOREIGN PATENT DOCUMENTS

| CN | 2383091 Y | 6/2000 |
| CN | 101794228 A | 8/2010 |
| CN | 101815126 A | 8/2010 |
| CN | 101858783 A | 10/2010 |
| EP | 1158485 B1 * | 7/2006 |

* cited by examiner

*Primary Examiner* — Chante Harrison
(74) *Attorney, Agent, or Firm* — Altis Law Group, Inc.

(57) ABSTRACT

An electronic reader which includes a storage unit, and an input unit generating signals in response to user input. In addition, a processing unit detects the signals corresponding to the user input; controls the electronic reader to enter a reading mode, and displays a file according to the user input, records a length of duration time for which the electronic reader operates in the reading mode; determines the duration time and executes a variety of protective instructions and steps depending on the length of duration time for which the electronic reader operates in the reading mode. A control method is also provided.

6 Claims, 3 Drawing Sheets

ELECTRONIC READER AND CONTROL METHOD THEREOF

BACKGROUND

1. Technical Field

The present disclosure relates to electronic readers and control methods thereof and, particularly, to an electronic reader and a control method for preventing an electronic device from damaging a user's health after long-term use.

2. Description of the Related Art

When users use an electronic device over a prolonged period without changing their posture, they will experience eye strain, problems with their spine, wrist tendonitis. Long-term static use of an electronic reader will do harm to users' health.

BRIEF DESCRIPTION OF THE DRAWINGS

The components of the drawings are not necessarily drawn to scale, the emphasis instead being placed upon clearly illustrating the principles of an electronic reader and a control method thereof. Moreover, in the drawings, like reference numerals designate corresponding parts throughout multiple views.

DETAILED DESCRIPTION

Figure 1:
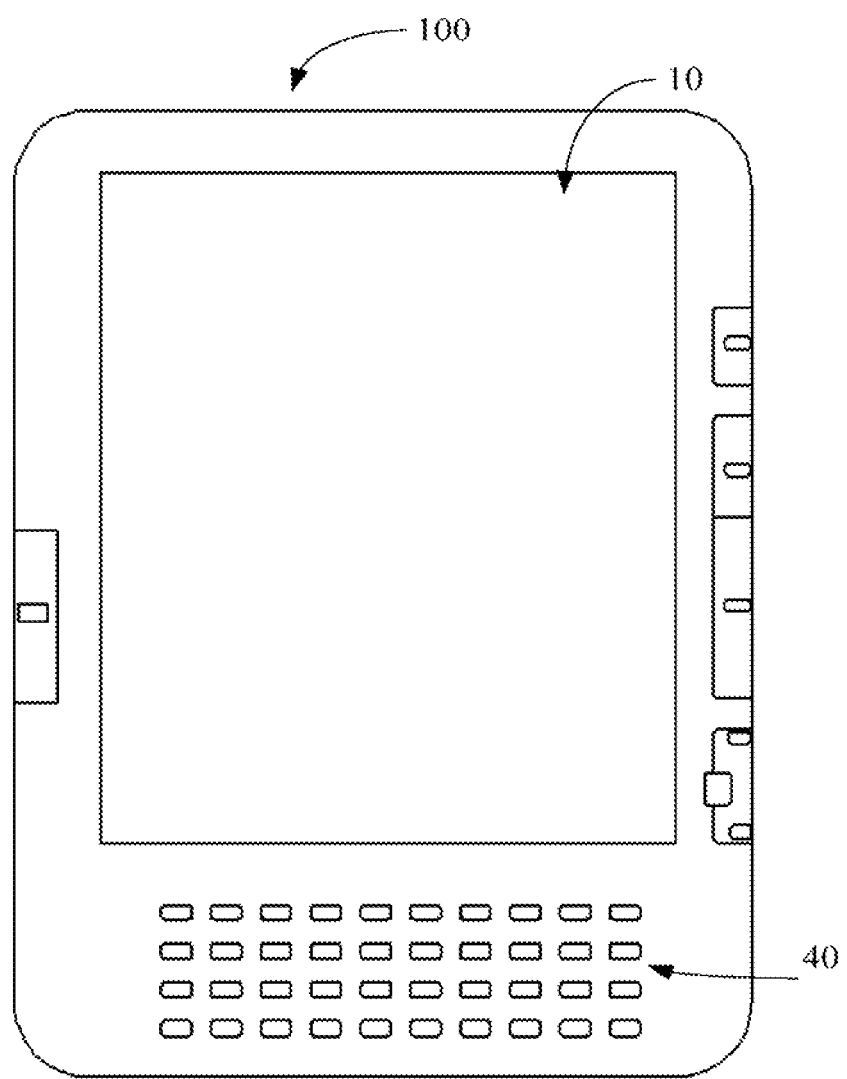
FIG. 1 is a schematic view of an electronic reader in accordance with an exemplary embodiment.
Figure 2:
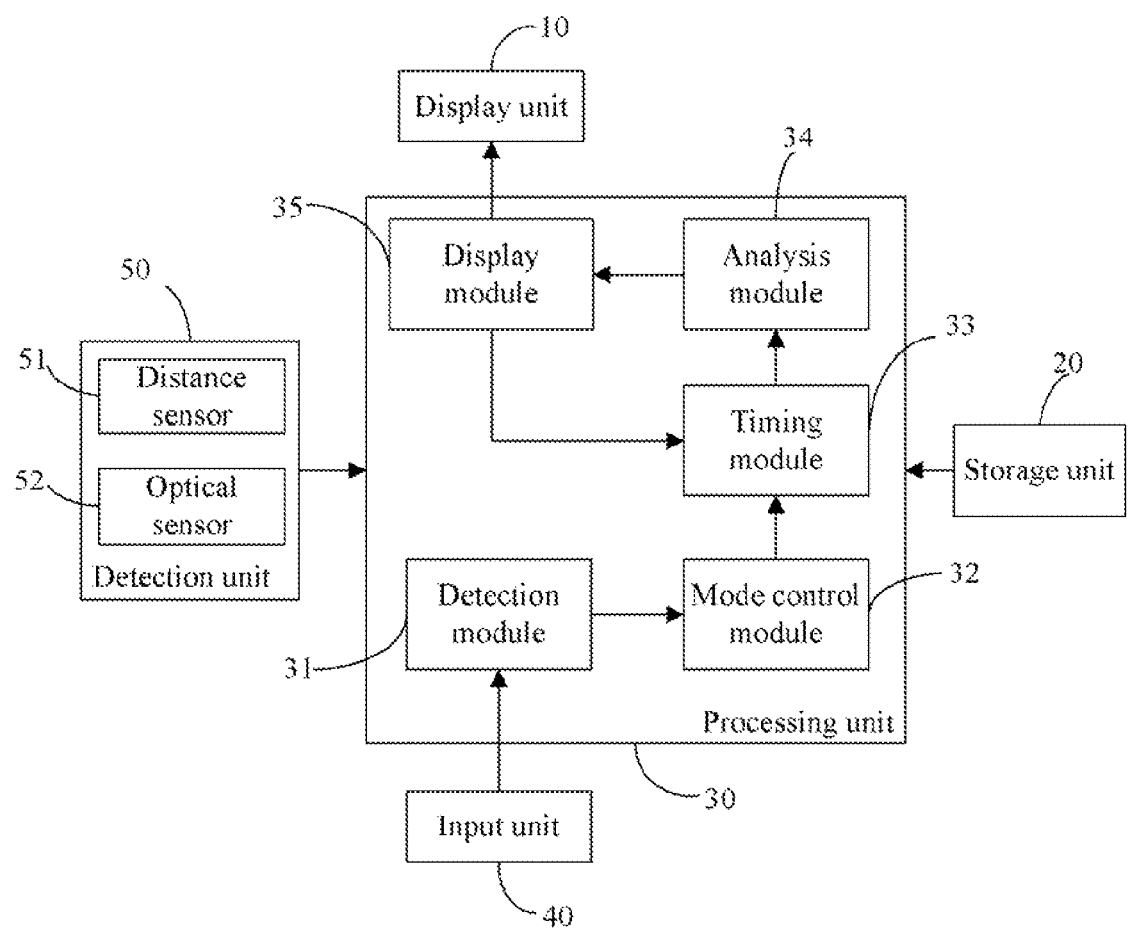
FIG. 2 is a block diagram of the electronic reader of FIG. 1.

Referring to FIGS. 1 and 2, an electronic reader 100 includes a display unit 10, a storage unit 20, a processing unit 30, an input unit 40, and a detection unit 50. The storage unit 20 stores electronic files. The input unit 40 receives and translates touch signals from the user. The processing unit 30 controls the electronic reader 100 to enter a reading mode, reads a file and displays a page of the file in a document window of the display unit 10 according to in the reading mode. The processing unit 30 executes protective instructions depending on a length of duration time for which the electronic reader 100 operates in the reading mode.

In detail, the processing unit 30 executes a first protective instruction if the duration time reaches a first preset time; the processing unit 30 executes a second protective instruction if the duration time reaches a second preset time; the processing unit 30 executes a third protective instruction if the duration time of the electronic reader 100 reaches a third preset time.

In the embodiment, the processing unit 30 includes a detection module 31, a mode control module 32, a timing module 33, an analysis module 34 and a display module 35. The detection module 31 is configured to detect mode signals from the input unit 40 and transmits the mode signals to the mode control module 32. The mode control module 32 causes the electronic reader 100 to enter a reading mode, and reads and opens a file according to a selection signal from the user. The timing module 33 commences to record a length of duration time for which the electronic reader 100 operates in the reading mode, which is in fact the time that the user spends in reading the file. The analysis module 34 determines the duration time of the electronic reader 100 operates in the reading mode and executes corresponding protective instructions.

In the embodiment, If the analysis module 34 determines the duration time has reached a first preset time, such as 20 mins, the display module 35 executes a first protective instruction. The first protective instruction is a command to the display module 35 to change the display properties of the characters on the display unit 10. For example, according to the first protective instruction, the display module 35 may change the front size, increase the spacing between words for reducing eye fatigue and change the angle of display of the page of the file to encourage users to change their posture.

If the analysis module 34 determines the duration time has reached a second preset time, such as 45 mins, the display module 35 executes a second protective instruction. The second protective instruction commands the display module 35 to display or play a reminder on the display unit 10, to remind the user to take measures to reduce fatigue. For example, the display module 35 may display a prompt such as "please do eye exercises" or "please change your posture" or "please take a rest" to users. In an alternative embodiment, a speaker and an audio processing unit are included in the electronic reader 100, the analysis module may command the audio processing unit to broadcast a prompt via the speaker.

If the analysis module 34 determines that the duration time has reached a third preset time, such as 60 mins, the display module 35 executes a third protective instruction. The third protective instruction commands the display module 35 to suspend the display unit 10 for a preset time period, such as 5 mins, to strongly encourage the user to take a rest. When the suspension time has reached the end of the preset time period, the display module 35 re-activates the display unit 10 and again displays the file. The electronic reader 100 may be programmed to be unresponsive to user input except the shut-down command while the display unit 10 is in suspension. The display module 35 resets the timing module 33 to record the suspension time of the display unit 10 once the display unit 10 has been suspended. After the display unit 10 is re-activated, the cycle begins again in that the display module 35 resets the timing module 33 to commence to record the length of time for which the electronic reader 100 operates in the reading mode, and the analysis module 34 and the protective instructions repeat as before.

In alternatively embodiments, the processing unit 30 executes only any two of the three protective instructions, and the order of executing the protective instructions may be different in various embodiments. The protective instructions may also include a command to change the background color of a file to render greater clarity to the content in the file.

The detection unit 50 is configured for detecting the level of the ambient light and the distance between a user and the electronic reader 100. In the embodiment, the detection unit 50 includes a distance sensor 51 and an optical sensor 52. The distance sensor 51 detects the distance between the head of a user and the display unit 10 after the electronic reader 100 has entered the reading mode, and transmits the distance to the processing unit 30. The optical sensor 52 detects the level of the ambient light, and transmits the data to the processing unit 30.

In the embodiment, the processing unit 30 may adjust the brightness of the display unit 10 and the size of a displayed page. For example, the distance sensor 51 detects the distance between the display unit 10 and the user's eyes; the display module 35 may determine whether the distance exceeds a preset distance. The display module 35 may warn the user that he or she is too near if the distance is less than a preset distance. Furthermore, the optical sensor 52 may detect the level of the ambient light. The display module 35 may increase the brightness of the display unit 10 if the level of the ambient light intensity is lower than a preset light intensity.

Figure 3:
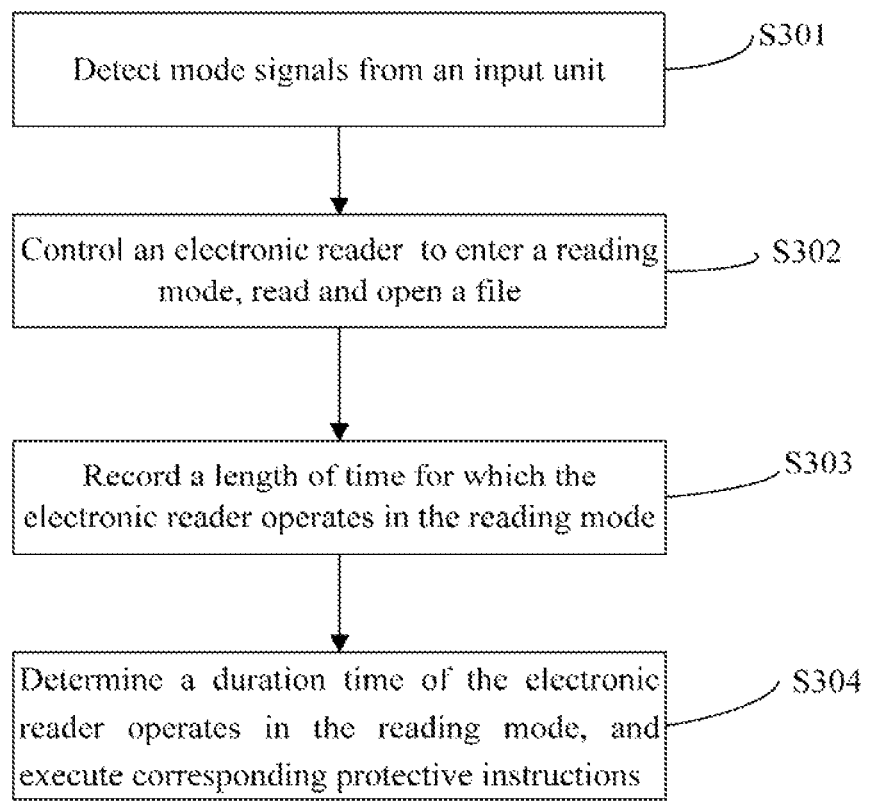
FIG. 3 is a flowchart of a control method applied in the electronic reader of FIG. 1 in accordance with an exemplary embodiment.

FIG. 3 shows a control method applied in the electronic reader 100 in accordance with an exemplary embodiment.

In step S301, a detection module 31 detects mode signals from an input unit 40.

In step S302, a mode control module 32 controls the electronic reader 100 to enter a reading mode, and reads and opens a file according to a selection signal from the input unit 40.

In step S303, a timing module 33 is triggered by the selection signal to record a length of time for which the electronic reader 100 operates in the reading mode.

In step S304, an analysis module 34 determines a duration time of the electronic reader 100 operates in the reading mode, and executes corresponding protective instructions.

In the embodiment, if the analysis module 34 determines that the duration time has reached a first preset time, such as 20 mins, the display module 35 executes a first protective instruction. The first protective instruction commands the display module 35 to change the display properties of the characters on the display unit 10.

If the analysis module 34 determines that the duration time has reached a second preset time, such as 45 mins, the display module 35 executes a second protective instruction. The second protective instruction commands the display module 35 to display or play a reminder on the display unit 10, to remind the user to take measures to avoid or reduce fatigue.

If the analysis module 34 determines that the duration time has reached a third preset time, such as 60 mins, the display module 35 executes a third protective instruction. The third protective instruction commands the display module 35 to suspend the operation of the display unit 10 for a preset time period, such as 5 mins, to require the user to take a rest. When the suspension time has reached the end of the preset time period, the display module 35 re-activates the display unit 10 and again displays the file. Whilst the display is suspended, the electronic reader 100 does not respond to any user input except the command to shut down. The display module 35 resets the timing module 33 to record the suspension time of the display unit 10 once the display unit 10 has been suspended. When the display unit 10 is re-activated, the display module 35 resets the timing module 33 to record the length of time for which the electronic reader 100 operates in the reading mode. The analysis module 34 cyclically determines the duration time of the electronic reader 100 operates in the reading mode, and executes protective instructions again as necessary.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic reader, comprising:
    a storage unit configured for storing electronic files;
    an input unit configured for generating input signals in response to user input operations;
    a display unit; and
    a processing unit configured for:
        controlling the electronic reader to enter a reading mode where the display unit is configured for displaying the electronic files in response to the input signals;
        recording a length of duration time for which the electronic reader operates in the reading mode;
        executing a first protective instruction if the duration time reaches a first preset time, wherein the first protective instruction is selected from the group consisting of changing display property of characters displayed on the display unit and playing a reminding file to remind user to take measures to reduce fatigue; and
        executing a second protective instruction if the duration time reaches a second preset time, the second preset time being greater than the first preset time;
        further controlling the input unit to be unresponsive to input operations excepting a shutdown command when the display unit is suspended, and activating the display unit after a preset suspension time period is lapsed.

2. The electronic reader as described in claim 1, wherein the processing unit is further configured for restarting recording of the duration time after the display unit is activated.

3. A control method applied in an electronic reader, comprising:
    detecting the input signals:
    controlling the electronic reader to enter a reading mode wherein a display unit displays an electronic file in response to the input signals;
    recording a length of duration time for which the electronic reader operates in the reading mode;
    executing a first protective instruction if the duration time reaches a first preset time;
    executing a second protective instruction if the duration time reaches a second preset time, the second preset time being greater than the first preset time;
    executing a third protective instruction if the duration time reaches a third preset time, wherein the third preset time is greater than the second preset time, the third protective instruction is selected from the group consisting of changing display property of characters displayed on the display unit, playing a reminding file to remind user to take measures to reduce fatigue, and suspending the display unit for a preset time period;
    activating the display unit after a preset suspension time period is lapsed; and
    restarting recording of the duration time after the display unit is activated.

4. The method as described in claim 3, further comprising steps of:
    activating the display unit after a preset suspension time period is lapsed; and
    restarting recording of the duration time after the display unit is activated.

5. An electronic reader, comprising:
    a storage unit configured for storing electronic files;
    an input unit configured for generating input signals in response to user input operations;
    a display unit; and
    a processing unit configured for:
        controlling the electronic reader to enter a reading mode where the display unit is configured for displaying the electronic files in response to the input signals;
        recording a length of duration time for which the electronic reader operates in the reading mode;
        executing a first protective instruction if the duration time reaches a first preset time, and
        executing a second protective instruction if the duration time reaches a second preset time, the second preset time being greater than the first preset time;
    a light detection unit configured for detecting ambient light intensity and a distance detection unit configured for detecting a distance between a user and the electronic reader.

6. The electronic reader as described in claim 5, wherein the processing unit is further configured for reminding the user if the distance between the user and the electronic reader exceeds a preset distance, and increasing the brightness of the display unit if the detected light intensity is lower than a preset light intensity.

\* \* \* \* \*